(12) United States Patent
Moravek et al.

(10) Patent No.: US 8,747,950 B2
(45) Date of Patent: Jun. 10, 2014

(54) METHOD OF MITIGATING ICE BUILD-UP ON A SUBSTRATE

(71) Applicant: PPG Industries Ohio, Inc., Cleveland, OH (US)

(72) Inventors: Scott Joseph Moravek, Cranberry Township, PA (US); Edward Francis Rakiewicz, Gibsonia, PA (US); Davina J Schwartzmiller, Allison Park, PA (US); Michael Zalich, Pittsburgh, PA (US); Jane N Valenta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/688,648

(22) Filed: Nov. 29, 2012

(65) Prior Publication Data

US 2013/0142958 A1    Jun. 6, 2013

Related U.S. Application Data

(60) Provisional application No. 61/566,077, filed on Dec. 2, 2011.

(51) Int. Cl.
*B05D 3/02* (2006.01)

(52) U.S. Cl.
USPC ............. 427/372.2; 427/385.5; 427/386; 427/387; 427/388.1; 427/393.5; 427/407.1; 427/412.1

(58) Field of Classification Search
None
See application file for complete search history.

(56) References Cited

U.S. PATENT DOCUMENTS

| 5,275,645 | A | 1/1994 | Ternoir et al. |
| 5,618,860 | A | 4/1997 | Mowrer et al. |
| 6,797,795 | B2 | 9/2004 | Byrd |
| 6,809,169 | B2 | 10/2004 | Byrd et al. |
| 7,799,434 | B2 | 9/2010 | Webster et al. |
| 7,820,770 | B2 | 10/2010 | Schoeley et al. |
| 7,910,683 | B2 | 3/2011 | Byrd et al. |
| 2003/0232941 | A1 | 12/2003 | Byrd |
| 2003/0235696 | A1 | 12/2003 | Byrd |
| 2008/0199723 | A1 | 8/2008 | Cho et al. |
| 2008/0213599 | A1 | 9/2008 | Webster et al. |
| 2008/0286473 | A1 | 11/2008 | Smith et al. |
| 2010/0178512 | A1* | 7/2010 | Giesenberg et al. .......... 428/405 |
| 2010/0280148 | A1 | 11/2010 | Webster et al. |
| 2010/0323190 | A9 | 12/2010 | Webster et al. |
| 2011/0082254 | A1 | 4/2011 | Sepeur et al. |
| 2013/0142957 | A1* | 6/2013 | Connelly et al. .............. 427/387 |
| 2013/0142959 | A1* | 6/2013 | Moravek et al. ........... 427/388.1 |

FOREIGN PATENT DOCUMENTS

| EP | 1849843 A1 | 10/2007 |
| WO | 2006006402 A1 | 1/2006 |
| WO | 2012065828 A1 | 5/2012 |

OTHER PUBLICATIONS

A. Dotan, et al., The Relationship between Water Wetting and Ice Adhesion, Journal of Adhesion Science and Technology 23 (2009) pp. 1907-1915.
Fraunhofer Ifam, Dr. Volkmar Stenzel, Anti-icing: Surfaces, Technical Approaches and Status, ECC "Smart Coatings" 2010, Berlin, Nov. 10, 2010, pp. 1-24.
NuSil Silicone Technology, Burkitt et al., Silicone Coatings for Aircraft, Sep. 25, 2007, pp. 1-16.

* cited by examiner

*Primary Examiner* — Erma Cameron
(74) *Attorney, Agent, or Firm* — Krisanne Shideler

(57) ABSTRACT

The present invention is directed to a method of mitigating ice build-up on a substrate, comprising applying to the substrate applying to the substrate a curable film-forming composition comprising:
  (a) a resinous component comprising:
    (i) a polyepoxide;
    (ii) a polysiloxane; and
    (iii) an organooxysilane;
  (b) a polyamine and/or an aminosilane;
  (c) at least one additional polysiloxane different from the polysiloxane of (ii) above, and
  (d) optionally a catalyst.
The film-forming compositions can be applied directly to the surface of the substrate or onto a primer coat on the substrate.

15 Claims, No Drawings

US 8,747,950 B2

METHOD OF MITIGATING ICE BUILD-UP ON A SUBSTRATE

CROSS-REFERENCE TO RELATED APPLICATIONS

This application claims the benefit of U.S. Provisional Application Ser. No. 61/566,077, filed Dec. 2, 2011.

FIELD OF THE INVENTION

The present invention relates to methods of mitigating ice build-up on substrates.

BACKGROUND OF THE INVENTION

Outdoor structures such as wind turbines, bridges, towers, tanks, and fleet vehicles such as railcars, buses, and trucks are constantly exposed to the elements and must be designed to endure temperature extremes, wind shears, precipitation, and other environmental hazards without significant damage or the need for constant maintenance, which may be time-consuming and costly. Build-up of ice on the substrate may lead to damage or even structural failure.

It would be desirable to provide a method of mitigating ice build-up to protect such outdoor structures and minimize need for repair or replacement.

SUMMARY OF THE INVENTION

The present invention is directed to a method of mitigating ice build up on a substrate, comprising applying to the substrate a curable film-forming composition; wherein the curable film-forming composition comprises:
 (a) a resinous component comprising:
  (i) a polyepoxide;
  (ii) a polysiloxane; and
  (iii) an organooxysilane;
 (b) a polyamine and/or an aminosilane;
 (c) at least one additional polysiloxane different from the polysiloxane of (ii) above, and
 (d) optionally catalyst.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," an and the include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

By "polymer" is meant a polymer including homopolymers and copolymers, and oligomers. By "composite material" is meant a combination of two or more different materials.

In the method of the present invention, ice build-up on a substrate is mitigated by applying to the surface of the substrate a curable film-forming composition. Suitable substrates in the method of the present invention include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GAL-VANNEAL, and combinations thereof. Combinations or composites of ferrous and non-ferrous metals can also be used. Inorganic zinc silicate coated surfaces are also suitable substrates. In certain embodiments of the present invention, the substrate comprises plastic or a composite material such as a plastic or a fiberglass composite.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner for metal substrates commercially available from PPG Industries, Inc.

Following the cleaning step, the substrate may be rinsed with deionized water or an aqueous solution of rinsing agents in order to remove any residue. The substrate can be air dried, for example, by using an air knife, by flashing of the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, etc., applied by any method including, but not limited to, electrodeposition, spraying, dip coating, roll coating, curtain coating, and the like.

In the method of the present invention, a curable film-forming composition is applied to at least one surface of the substrate. A substrate may have one continuous surface, or two or more surfaces such as two opposing surfaces. Typically the surface that is coated is any that is expected to be exposed to conditions conducive to ice build-up.

The curable film-forming composition applied to the substrate in the method of the present invention comprises:

(a) a resinous component comprising:
   (i) a polyepoxide;
   (ii) a polysiloxane; and
   (iii) an organooxysilane;
(b) a polyamine and/or difunctional aminosilane hardener; and
(c) at least one additional polysiloxane different from the polysiloxane of (ii) above, and
(d) optionally catalyst such as an organo tin compound.

The resinous component (a), hardener component (b), and any desired catalysts are combined in the presence of a sufficient amount of water to promote the hydrolysis of polysiloxane and/or organooxysilane and the polycondensation of the silanols produced by such hydrolysis. The aminosilane and epoxide resin react to form a cured linear epoxy polymer. The polysiloxane and/or organooxysilane undergo a hydrolysis reaction which produces silanol. The silanol undergoes polycondensation forming a linear epoxy-modified polysiloxane polymer.

The polyepoxides (i) are typically non-aromatic hydrogenated resins which contain more than one 1,2-epoxy groups per molecule and more often two 1,2-epoxy groups per molecule. The weight per epoxide of such resins are within the range of from 100 to about 2000. Usually the epoxide resins contain glycidyl ether or ester groups, are liquid rather than solid and have weight per epoxide in the range of from about 100 to about 500. The polyepoxide is present in the resinous component (a) in an amount ranging from 15 to 45 percent by weight, based on the total weight of resin solids in the resinous component.

The polysiloxanes (ii) generally have the formula: R"—O—[Si(R')$_2$—O—]$_n$—R" where each R' is selected from the group consisting of hydroxyl, alkyl, aryl and alkoxy groups having up to six carbon atoms. Each R" is selected from the group consisting of hydrogen and alkyl and aryl groups having up to six carbon atoms and wherein n is selected so that the molecular weight of the polysiloxanes may be in the range of from 400 to about 2000 such as 900-2000. The polysiloxane is present in the resinous component (a) in an amount ranging from 15 to 45 percent by weight, based on the total weight of resin solids in the composition.

Organooxysilanes (iii) typically have the formula: $R_3$—Si$(OR_4)_3$ where $R_3$ is selected from the group consisting of aryl, alkyl, and cycloalkyl groups containing up to six carbon atoms and where $R_4$ is independently selected from the group consisting of alkyl, hydroxyalkyl, alkoxyalkyl and hydroxyalkoxyalkyl groups containing up to six carbon atoms. The organooxysilane is present in the resinous component (a) in an amount ranging from 1 to 10 percent by weight, based on the total weight of resin solids in the composition The epoxy resin, polysiloxane and organooxysilane are combined to form the resinous component (a), which is present in the curable film-forming composition in an amount of 80 to 90 percent by weight, based on the total weight of resin solids in the curable film-forming composition.

The hardener (b) comprises an amine selected from the general classes of aliphatic amines, aliphatic amine adducts, polyamidoamines, cycloaliphatic amines and cycloaliphatic amine adducts, aromatic amines, Mannich bases and ketimines which may be substituted wholly or in part with an aminosilane having the general formula Y—Si—(O—X)$_3$ where Y is H(HNR)$_a$ and where a is an integer from two to about six, each R is a difunctional organic radical independently selected from the group consisting of aryl, alkyl, dialkylaryl, alkoxyalkyl, and cycloalkyl radicals, and R can vary within each Y molecule. Each X can be the same or different, and is limited to alkyl, hydroxalkyl, alkoxyalkyl and hydroxyalkoxyalkyl groups containing less than about six carbon atoms. At least 0.7 equivalents of amine or 0.2 moles of aminosilane per equivalent of epoxy are present in the polyamine and/or polyfunctional aminosilane (b). Such amine functional materials are typically difunctional, where "a" in the formula set forth above for the aminosilane is one. The hardener (b) is typically present in the curable film-forming composition in an amount of 10 to 20 percent by weight, based on the total weight of resin solids in the curable film-forming composition An additional polysiloxane (c) may be present in the curable film-forming composition, and is different from the polysiloxane used in the resinous component (a). Suitable polysiloxanes often have number average molecular weights of 200 to 14000, such as 900 to 2000, and include polymeric polysiloxanes such as polydimethylsiloxane (PDMS). The polysiloxane is either non-functional or has at least one functional group that is reactive with functional groups on at least one other component in the curable film-forming composition. For example, the polysiloxane may have at least one hydroxyl and/or amine functional group, such as PDMS with at least two amine functional groups, allowing it to react with the curing agent having isocyanate functional groups. Examples of commercially available polysiloxanes include WACKER FLUID NH 15D, 40D, and 130D, from Wacker Chemie AG. Typical amounts of polysiloxane in the curable film-forming composition range from 1 to 35 percent by weight, often 5 to 30 percent by weight, based on the total weight of resin solids in the curable film-forming composition.

When a catalyst (d) is included, it is typically intended to effect or promote the reaction between functional groups in the resinous component (a) and the hardener (b) as noted above. A typical catalyst is an organometallic compound such as an organotin catalyst having the general formula:

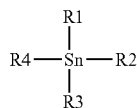

where R1 and R4 are selected from a group consisting of alkyl, aryl, and alkoxy groups having up to eleven carbon atoms, and R2 and R3 are selected from the same groups as R1 and R4, or from a group consisting of inorganic atoms such as halogens, sulphur or oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis(isooctylthioglycolate), butyltin trichloride, butylstannoic acid, dioctyltin dichloride, dioctyltin oxide, dioctyltin dilaurate, dioctyltin maleate polymer, dioctyltin bis(isooctylthioglycolate)dioctyltin sulfide, dibutyltin 3-mercapto propionate).

An exemplary organotin compound is dibutyltin dilaurate. The combination of the dibutyltin compound with the amine in the hardener (b) acts to catalyze the curing process.

Other organometallic compounds suitable as catalysts, although less so due to lower reactivity, include organic iron, nickel, copper, platinum or lead compounds.

The film-forming composition may further comprise a filler. Examples of fillers that can be present include finely divided minerals such as barium sulfate, silica, including fumed silica and colloidal silica, alumina, colloidal alumina, titanium dioxide, zirconia, colloidal zirconia, day, mica, dolomite, talc, magnesium carbonate, calcium carbonate, calcium sulfate, calcium silicate, and/or calcium metasilicate. It is believed that the fillers, in combination with the resins in the composition, allow for useful rheological properties such as high viscosity at low shear. The combination of fillers and resins in the coating composition also allows for filling and/or bridging of surface defects on a substrate, making the substrate surface smoother than would be possible with other coating compositions. The ability of the first coating layer to smooth surface defects on the substrate substantially decreases or even eliminates the need for substrate surface preparation such as by sanding or the use of body putty, which can be time-consuming, labor-intensive, and expensive manufacturing steps. This advantage is particularly useful in the coating of large substrate parts or substrates with significant surface roughness, such as fiberglass substrates used in the manufacturing of wind blades. In certain embodiments of the present invention, at least 80 percent of surface defects of a substrate are corrected to an acceptable degree (i.e., requiring no additional surface preparation) upon application of the coating layer.

The film-forming composition can additionally include a variety of optional ingredients and/or additives that are somewhat dependent on the particular application of the curable composition, such as other curing catalysts, pigments or other colorants as discussed below, reinforcements, thixotropes, accelerators, surfactants, plasticizers, extenders, stabilizers, corrosion inhibitors, diluents, hindered amine light stabilizers, UV light absorbers, and antioxidants.

The curable compositions used in the present invention can be prepared as a two-package composition, typically curable at ambient temperature. Two-package curable compositions are typically prepared by combining the ingredients immediately before use.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 2-25 mils (50.8-635 microns), often 5-25 mils (127-635 microns).

The film-forming compositions can be applied directly to the surface of the substrate or onto a primer coat or other coating on the substrate. An example of a suitable primer is AMERLOCK 2/400.

After forming a film of the coating on the substrate, the composition can be cured by allowing it to stand at ambient temperature, or a combination of ambient temperature cure and baking. The composition can be cured at ambient temperature typically in a period ranging from about 4 to about 38 hours. If ambient humidity is below 40% relative humidity then cure times may be extended. After application of the curable film-forming composition to the substrate and upon curing, the coated substrate demonstrates a maximum average load force of 400 N, often 300 N, more often 200 N or 100 N, when subjected to ICE ADHESION TEST described below.

EXAMPLES

/To evaluate the effectiveness of formulation changes on ice adhesion an ICE ADHESION TEST was developed. The test method used was described in US Army Corps of Engineers Engineer Research and Development Center document number ERDC/CRREL TR-06-11, which is incorporated herein by reference. The fixture design as described therein was modified to interface with existing testing equipment and to receive test panels of approximately 0.032" thick. Generally, the procedure was as follows: A 4" wide test panel was coated on both sides with the desired coating(s). After the appropriate cure time, five 1×4" strips were cut from the test panel. The test strips were taped in place in the center of the test fixture such that the fixture could be filled with water one inch deep. Chilled water was used to fill the test fixtures ensuring that both sides of the coated panel are in contact with one inch of water. The entire test fixture was placed in a −20° C. freezer overnight. Then the test fixture was transferred to a tensile tester (e.g. INSTRON 5567) equipped with an environmental chamber also set to −20° C. The test fixture was mounted such that the fixed end of the tensile tester is connected to the test fixture and the movable jaw is connected to the test panel. This testing setup creates a relative motion between the test strip and the ice that was formed from the water. The tape that held the test strip and water in place was removed and then, using a constant extension rate, the maximum force required to remove the panel from the ice was recorded. Typically, five specimens of each coating variation were tested and an average maximum load reported.

Example 1

Example 1 demonstrates the preparation of curable film-forming compositions according to the present invention.

Various polydimethyl siloxane (PDMS) materials were incorporated into PSX 700 resin component (commercially available from PPG Industries, Inc.), an engineered siloxane coating manufactured per U.S. Pat. Nos. 5,618,860 and 5,275,645, incorporated herein by reference. The PDMS materials tested were incorporated into the PSX700 by adding the PDMS to the PSX 700 and stirring. Then the cure component was added and the mixture was again stirred. Table 1 shows the formulations tested. Formulation 1 is the comparative control, with no additional polysiloxane (c) included.

TABLE 1

Formulations of PSX 700 with PDMS.

| | Formulation | | |
|---|---|---|---|
| Description | 1 (g) | 2 (g) | 3 (g) |
| PSX 700 Resin | 172.02 | 158.39 | 158.39 |
| WACKER FLUID NH 130 D[1] | | 15.84 | |
| RHODORSIL ® 48 V 3500[2] | | | 15.84 |
| PSX 700 Cure | 27.98 | 25.76 | 25.76 |
| Total | 200 | 200 | 200 |

[1] Available from Wacker Silicones
[2] Available from Bluestar Silicones

The coating was applied to a cold-rolled steel panel test panel coated with ED6060CZ obtained from ACT Test Panels LLC after scuffing the surface with a 3M SCOTCH-BRITE. The coating was applied using an HVLP spray gun at 30 psi. The coating was applied in two coats with a five to ten minute ambient flash between coats. The coating was allowed to dry and cure for seven days under ambient conditions prior to testing. Ice adhesion testing was then carried out per the above described procedure. Table 2 outlines the ice adhesion testing results. The weight percent PDMS is calculated by multiplying the desired percentage times the PSX-700 resin mass,

TABLE 2

Ice adhesion test results.

| Formulation | Wt % PDMS | Avg. max load (N) |
|---|---|---|
| 1 | None | 438 |
| 2 | 10% FLUID NH 130 D | 59 |
| 3 | 10% RHODORSIL ® 48 V 3500 | 40 |

Incorporation of the various PMDS materials reduced the observed maximum average load by approximately 380-400 N, or approximately 90%, as compared to formulation 1, the control formulation.

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A method of mitigating ice build-up on a substrate, comprising applying to the substrate a curable film-forming composition comprising:
    (a) a resinous component comprising:
        (i) a polyepoxide;
        (ii) a polysiloxane; and
        (iii) an organooxysilane;
    (b) a polyamine and/or an aminosilane;
    (c) at least one additional polysiloxane different from the polysiloxane of (ii) above, and
    (d) optionally a catalyst, wherein after application of the curable film-forming composition to the substrate and upon curing, the coated substrate demonstrates a maximum average load force of 400 N when subjected to ICE ADHESION TEST.

2. The method of claim 1, wherein the polyepoxide (i) comprises a non-aromatic hydrogenated resin which contains more than one glycidyl ether or ester group per molecule.

3. The method of claim 1, wherein the polysiloxane (ii) has the formula: $R''-O-[Si(R')_2-O-]_n-R''$ where each R' is selected from hydroxyl, alkyl, aryl and alkoxy groups; each R'' is selected from hydrogen, alkyl and aryl groups and wherein n is selected so that the number average molecular weight of the polysiloxanes is in the range of from 400 to 2000.

4. The method of claim 1 wherein the organooxysilane (iii) has the formula: $R_3-Si(OR_4)_3$ where $R_3$ is selected from aryl, alkyl, and cycloalkyl groups and where $R_4$ is independently selected from alkyl, hydroxyalkyl, alkoxyalkyl and hydroxyalkoxyalkyl groups.

5. The method of claim 4 wherein the polysiloxane (c) comprises at least one hydroxyl and/or amine functional group.

6. The method of claim 5 wherein the polysiloxane (c) comprises polydimethylsiloxane comprising at least two hydroxyl and/or amine functional groups.

7. The method of claim 1 wherein the polysiloxane (c) has a number average molecular weight of 200 to 14,000.

8. The method of claim 1 wherein the polysiloxane (c) is present in the curable film-forming composition in an amount of 1 to 35 percent by weight, based on the total weight of resin solids in the curable film-forming composition.

9. The method of claim 8 wherein the polysiloxane (c) is present in the curable film-forming composition in an amount of 5 to 30 percent by weight, based on the total weight of resin solids in the curable film-forming composition.

10. The method of claim 1, wherein the curable film-forming composition is cured at ambient temperature.

11. The method of claim 1, wherein the substrate comprises metal, plastic, and/or a composite.

12. The method of claim 11, wherein the substrate comprises steel.

13. The method of claim 1, wherein a primer film-forming composition is applied to the substrate prior to the application of the curable film-forming composition.

14. The method of claim 1 wherein the polysiloxane (c) comprises at least one hydroxyl and/or amine functional group.

15. The method of claim 14 wherein the polysiloxane (c) comprises polydimethylsiloxane comprising at least two hydroxyl and/or amine functional groups.

* * * * *